United States Patent [19]

Yamada et al.

[11] Patent Number: 5,422,671
[45] Date of Patent: Jun. 6, 1995

[54] AUTOMATIC FOCUS CONTROL BY USE OF COMPONENT VALUE DIFFERENCES IN AN IMAGE SENSING PLANE

[75] Inventors: Kunihiko Yamada, Tokyo; Akihiro Fujiwara, Kanagawa; Masamichi Toyama, Kanagawa; Hirofumi Suda, Kanagawa; Kitahiro Kaneda, Kanagawa; Katsuji Yoshimura, Shizuoka, all of Japan

[73] Assignee: Canon Kabushiki Kaisha, Tokyo, Japan

[21] Appl. No.: 277,701

[22] Filed: Jul. 20, 1994

Related U.S. Application Data

[60] Continuation of Ser. No. 170,453, Dec. 20, 1993, which is a continuation of Ser. No. 961,403, Oct. 15, 1992, which is a division of Ser. No. 845,768, Mar. 2, 1992, Pat. No. 5,164,835, which is a continuation of Ser. No. 741,233, Aug. 5, 1991, abandoned, which is a continuation of Ser. No. 237,511, Aug. 26, 1988, abandoned.

[30] Foreign Application Priority Data

Sep. 2, 1987 [JP] Japan .................................. 62-219670
Sep. 12, 1987 [JP] Japan .................................. 62-228993
Mar. 30, 1988 [JP] Japan .................................. 63-079814

[51] Int. Cl.⁶ ............................................. H04N 5/232
[52] U.S. Cl. ........................................ 348/345; 348/352
[58] Field of Search ............................ 348/345, 352

[56] References Cited

U.S. PATENT DOCUMENTS

| | | | |
|---|---|---|---|
| 4,639,767 | 1/1987 | Suzuki | 358/105 |
| 4,661,853 | 4/1987 | Roeder et al. | 358/105 |
| 4,816,919 | 3/1989 | Coates | 358/227 |
| 4,872,058 | 10/1989 | Baba et al. | 358/227 |
| 4,985,777 | 1/1991 | Kawada | 358/227 |
| 5,164,835 | 11/1992 | Yamada et al. | 358/227 |

*Primary Examiner*—Yon J. Couso
*Assistant Examiner*—Wendy R. Greening
*Attorney, Agent, or Firm*—Robin, Blecker, Daley & Driscoll

[57] ABSTRACT

An automatic focusing device comprises a binary coded information producing unit for producing binary coded information by comparing the levels of a predetermined component in each of a plurality of areas set on an image sensing plane of and image sensor with a predetermined value, a first detector for comparing binary coded information in each of the plurality of areas in one field with that in another field among a plurality of fields differing timewise from each other to produce a signal based on the difference between the two binary coded information, a second detector for detecting a total value, for one image plane, of differences in the predetermined component between adjacent areas among the plurality of areas of the image sensing plane, a computing unit for obtaining a degree of relative variations in information on images formed on the image sensing plane in different fields by computing the result of detection made by the first and second detectors and a control unit for controlling a focus adjusting action on the basis of an output of the computing unit.

55 Claims, 8 Drawing Sheets

AUTOMATIC FOCUS CONTROL BY USE OF COMPONENT VALUE DIFFERENCES IN AN IMAGE SENSING PLANE

This is a continuation application under 37 CFR 1.62 of prior application Ser. No. 08/170,453, filed Dec. 20, 1993 which is a continuation of Ser. No. 961,403, filed Oct. 15, 1992, which is a divisional of Ser. No. 845,768 filed on Mar. 2, 1992 issued as U.S. Pat. No. 5,164,835, which is a continuation of Ser. No. 741,233 filed Aug. 5, 1991 (abandoned), which is a continuation of Ser. No. 237,511 filed Aug. 26, 1988 (abandoned).

BACKGROUND OF THE INVENTION

1. Field of the Invention

This invention relates to an automatic focusing device using a video signal obtained from an image sensor.

2. Description of the Related Art

Various methods which have been proposed for automatic focusing devices include a method of using a video signal obtained from image sensing means. In the case of this method, automatic focus adjustment is generally performed either by extracting a high frequency component of a video signal or obtaining a differential value thereof and by shifting the position of a lens in the direction of increasing the absolute value of the high frequency component. The method of this kind has long been known, for example, from an article entitled "Automatic Focus Adjustment of TV Camera by Hill Climbing Method," appeared in "NHK Technical Research Report," 1965, Vol. 17, No. 1 (Whole No. 86) which has described this method in detail.

FIG. 1 of the accompanying drawings shows a typical arrangement of the hill climbing method. Referring to FIG. 1, the illustration includes a lens 1; an image sensor 2 which is arranged to convert an image formed on an image sensing plane into an electrical signal; a preamplifier 3 which is arranged to amplify a video signal produced from the image sensor 2; a processing circuit 4 which is arranged to convert the output of the preamplifier 3 into a video signal in conformity to such standardized specifications as those of the NTSC color system; a band-pass filter (hereinafter referred to as BPF) 5 which is arranged to extract only a high frequency component from the output of the preamplifier 3; a detection circuit 6 which is arranged to detect the output of the BPF 5; a motor driving circuit 7 arranged to drive a lens driving motor 8 on the basis of the output of the detection circuit 6; and the lens driving motor 8 which is arranged to drive and shift the position of the lens 1 for focusing.

In accordance with the above stated arrangement, the image formed on the image sensing plane of the image sensor 2 via the lens 1 is converted into an electrical signal, or more specifically, a video signal. This signal is amplified to a given level by means of the preamplifier 3. The video signal has its high frequency component vary according to the position of the lens 1, that is, in proportion to the focusing state of the lens 1 on an object to be photographed. The high frequency component increases accordingly as the lens 1 comes closer to an in-focus state for the object. The lens 1 is in-focus when the high frequency component of the video signal is at a maximum value. FIG. 2 shows variations taking place in the high frequency component of the video signal in relation to the lens position. The high frequency component reaches a maximum point at a point A. As shown, the high frequency component decreases accordingly as the lens 1 deviates from the in-focus point. Hence, the in-focus state of the lens 1 is attainable by shifting the position of the lens 1 in a direction in which the maximum point of the high frequency component is obtainable and by stopping the lens 1 at at that specific point.

However, a camera having an automatic focusing device arranged in the manner as described above has the following drawback: In case that the camera is shaken in the horizontal direction while the lens 1 is set in an in-focus position, i.e., at a point A of FIG. 2, the high frequency component level of the video signal drops to become lower than a level obtained when the lens 1 is in the same in-focus state without any shake of the camera. The reason for this: The image sensor 2 is arranged to accumulate in each of its picture elements an image projected thereon via the lens 1 during one field period (about 1/60 sec in the case of the NTSC system, hereinafter referred to as 1 V). In the event of camera shake or in the case of a panning operation, the whole image formed on the image sensing plane of the image sensor 2 shifts to an extent as much as the moved extent of the camera within one field period. Then, the image component to be accumulated in one picture element when the camera is in repose comes to be accumulated over a plurality of adjacent picture elements. In other words, the image under such a condition becomes as if a video signal is applied to a low-pass filter. As a result, the high frequency component of the signal comes to diminish.

In the the event, the lowered high frequency component misleads the automatic focusing device to judge that the lens is out of focus for the object. Then, while the lens is in-focus in actuality, the lens driving motor 8 comes to be driven to actuate the automatic focusing device. In that event, the lens is temporarily brought out of focus. Generally, a video camera, particularly a home or handy-type video camera, is held by hand for photographing. Hand shake thus tends to be introduced to the camera. It has been desired to prevent the camera from being brought out of focus by such camera shake or by a panning operation.

Further, another problem arises when the object moves after the lens is focused on the object. In the conventional automatic focusing device which is arranged as shown in FIG. 1, the variations as shown in FIG. 2 take place in the high frequency component of the video signal only in the case of a single object with a relatively uniform background shown in FIG. 3(a). In cases where the background is complex as shown in FIG. 3(b) or where the object has another object in a different position as shown in FIG. 3(c), the high frequency component no longer comes to vary in such a simple manner as shown in FIG. 2 but varies to have a plurality of peak values as shown in FIGS. 3(d) and 3(e). In such a case, the conventional method of using image information on the whole image plane tends to cause a so-called depthwise confusion in which the lens is focused neither on the object nor on the background. To solve this problem, a gate circuit is inserted in between the preamplifier 3 and the BPF 5 of FIG. 1. The distance measuring range is limited by this arrangement by allowing only such a part of the video signal that corresponds to the focusing zone (a distance measuring frame) set within a specific part of a video image plane as shown in FIGS. 4(a) and 4(b). This is one of varied methods conventionally used for solving the problem of the above stated depthwise confusion.

FIG. 4(a) shows a method wherein the distance measuring frame is not only set on the image plane but also arranged to have the size thereof variable in the middle part of the image plane, so that a focusing action can be carried out appositely to the size of the object. The details of this method are disclosed, for example, in Japanese Laid-Open Patent Application No. SHO 61-18271.

FIG. 4(b) shows another case, wherein the location of the distance measuring frame on the image plane is arranged to be variable upward, downward, leftward or rightward. A focusing zone is thus arranged to be variable by shifting the distance measuring frame by operating a button switch according to the position of the object. The details of that method are disclosed, for example, in Japanese Laid-Open Patent Application No. SHO 57-183186, Japanese Laid-Open Patent Application No. SHO 59-105773, etc.

These methods, however, have presented the following problems: In the case of FIG. 4(a), the method enables the size of the distance measuring frame to be automatically changed in the middle part of the image plane according to the focusing state of the lens. However, this method is effective only in cases where the object is set in the middle part of the image plane. However, unlike a still camera, a video camera is often used for taking a picture of a moving object and tends to be seldom used for taking a picture of an object staying in the middle of the image plane. When the object moves outside of the distance measuring frame during a picture taking operation, the lens is focused on something else.

In the method of FIG. 4(b), the distance measuring frame is shiftable accordingly as the object moves. However, the shift is manually effected by means of a push button switch or the like and is limited to the location of the frame. The camera is incapable of autocratically detecting and tracing the movement of the object. Therefore, the operator is required to manually perform a position control operation, which is complex and tends to result in a faulty operation. Since the operator is required to constantly follow the object, such a picture taking operation imposes an excessive burden on the operator. The method, therefore, can hardly be regarded as advantageous.

SUMMARY OF THE INVENTION

This invention is directed to the solution of the above stated problems of the prior art. A first object of the invention is to provide an automatic focusing device which solves the first of the above stated problems of the prior art. The device is arranged to detect the movement of an image on a photo taking image plane and to be capable of making a discrimination between a move due to the movement of the camera and a move due to the movement of the object to be photographed.

To attain this object, an automatic focusing device which is arranged as a preferred embodiment of the invention comprises binary coded information producing means for producing binary coded information by comparing the level of a predetermined frequency component in each of a plurality of areas set on an image sensing plane of image sensing means with a predetermined value; detecting means for comparing binary coded information in each of the plurality of areas in one field with that in another field among a plurality of fields differing timewise from each other to produce a signal based on the difference between the two binary coded information; computing means for obtaining a degree of relative variations of information on images formed on the image sensing plane in different fields by computing the result of detection made by the detecting means; and control means for controlling a focus adjusting action on the basis of an output of the computing means.

The automatic focusing device arranged in this manner is capable of accurately making a discrimination between a change of a whole image plane due to the vibrations of the image plane such as camera shake and a partial change of the image plane due to the movement of a main object. In the event of camera shake, the focusing action is brought to a stop to prevent an in-focus state from deviating. In the case of the movement of the main object, the focusing action is allowed to be continued. This arrangement, therefore, effectively prevents a video camera or a video apparatus of a similar kind operated mostly in a state of being held by hand from performing a faulty operation due to camera shake or panning.

It is a second object of the invention to provide an automatic focusing device which is arranged to solve the second of the problems of the prior art mentioned in the foregoing. The device is capable of accurately making a discrimination between a movement taking place on the side of the camera and a movement on the side of the object without being affected by the size and speed of the object, background conditions, etc.

To attain this object, an automatic focusing device arranged as another preferred embodiment of this invention comprises: luminance difference producing means for producing information on a luminance difference between adjacent areas among a plurality of areas set on an image sensing plane of image sensing means; detecting means for detecting variations of the information on the luminance difference in a plurality of fields differing timewise from each other; computing means for obtaining a degree of relative variations of information on images formed on the image sensing plane in different fields by computing the result of detection made by the detecting means; and control means for controlling a focus adjusting action on the basis of an output of the computing means.

The embodiment is capable of accurately and stably obtaining the degree of changes taking place on the image plane without being easily affected by monotonousness of a background or the size of area occupied by the object within the image plane. This permits an accurate discrimination between camera shake and a change taking place solely in the position of the object. The focusing action thus can be adequately controlled according to the result of the discrimination.

It is a further object of the invention to provide an image movement detecting device which is capable of accurately and reliably detecting any movement that takes place solely in the image of an object.

A further object of the invention is to provide an automatic focusing device which is capable of continuously performing a focusing action without being affected by a moving object.

To attain this object, an automatic focusing device which is arranged as a further preferred embodiment of the invention comprises: binary coding means arranged to sample information on an image formed on an image sensing plane of image sensing means in a plurality of areas of the image sensing plane, and to binary-code the sampled information in accordance with a predetermined law or algorithm to produce binary coded information; detecting means for comparing binary coded information in each of the plurality of areas in one field with that in another field among a plurality of fields differing timewise from each other to detect a change in the binary coded information; computing means for computing information on a position on the image sensing plane of an area in which the change in the binary coded information has been detected by the detecting means to detect a moved position of image information formed on the image sensing plane; zone setting means for setting a focus detecting zone on the image sensing plane; and control means for controlling a position of the focus detecting zone on the image sensing plane by controlling the zone setting means according to an output of the computing means.

It is a still further object of the invention to provide an automatic object tracing device which is capable of detecting, in binary information, only the movement of an object's image taking place on an image sensing plane within the range of a divided area and is capable of accurately tracing the object's image with a high degree of reliability. To attain this object, the automatic object tracing device comprises: binary coding means arranged to sample information on an image formed on an image sensing plane of image sensing means in a plurality of areas on the image sensing plane, and to binary-code the sampled information in accordance with a predetermined law or algorithm to produce binary coded information; detecting means for comparing binary coded information in each of the plurality of areas in one field with that in another field among a plurality of fields differing timewise from each other to detect a change in the binary coded information; computing means for computing information on a position on the image sensing plane of an area in which the change in the binary coded information has been detected by the detecting means to detect a moved position of image information formed on the image sensing plane; zone setting means for setting a tracing zone for tracing an object on the image sensing plane; and control means for controlling a position of the tracing zone on the image sensing plane by controlling the zone setting means according to an output of said computing means.

Other objects and features of the invention will be apparent from the following detailed description with reference to the accompanying drawings.

DETAILED DESCRIPTION OF THE PREFERRED EMBODIMENTS

Figure 1:
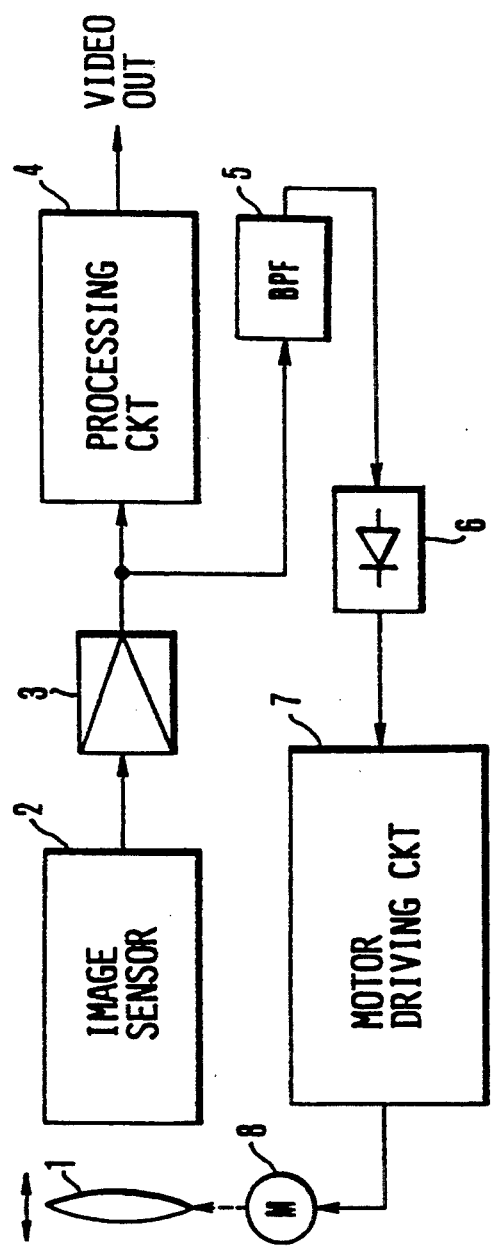
FIG. 1 is a block diagram showing an example of the conventional automatic focusing device.
Figure 2:
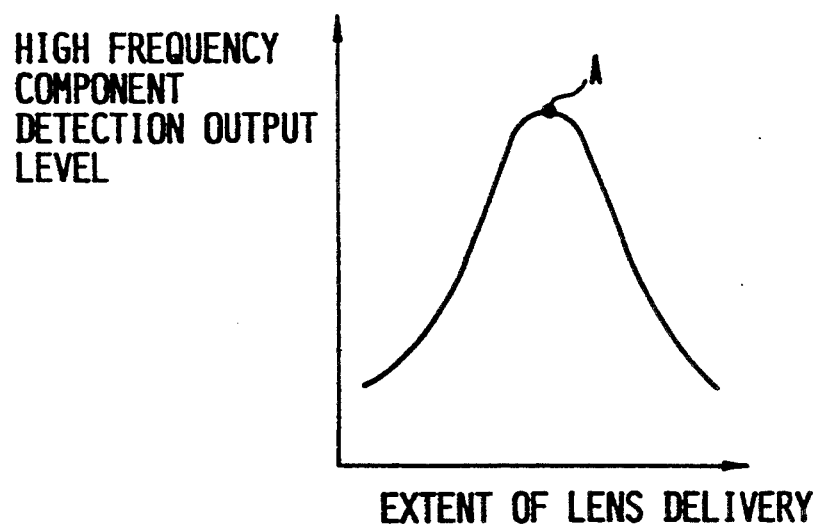
FIG. 2 is a graph showing a high frequency component of a video signal obtained on an image sensing plane in relation to the extent of lens delivery.
Figures 4A, 4B:
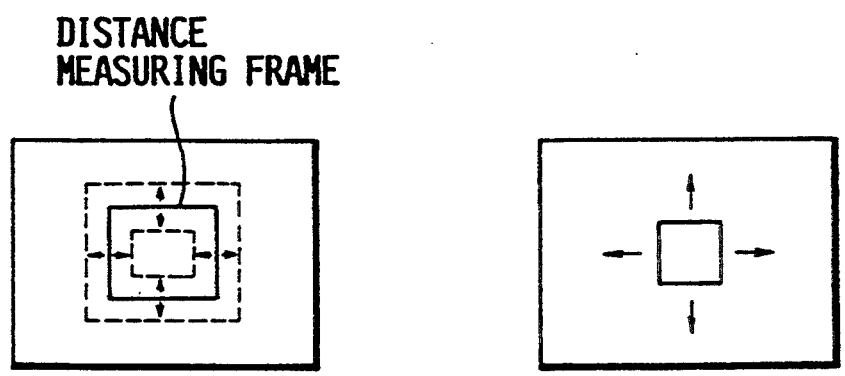
FIGS. 4(a) and 4(b) show by way of example a distance measuring frame (focus detecting zone) set on the image sensing plane.
Figure 3A:
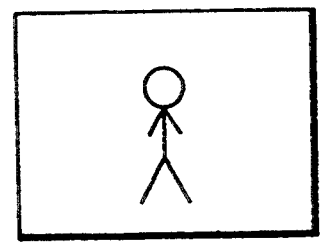
FIGS. 3(a) to 3(e) show the patterns of images formed on the image sensing plane and the characteristic of a relation between the high frequency component and the extent of lens delivery.
Figure 3B:
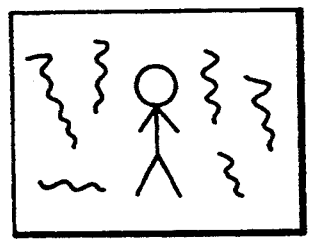
Figure 3C:
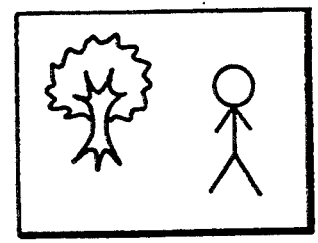
Figure 3D:
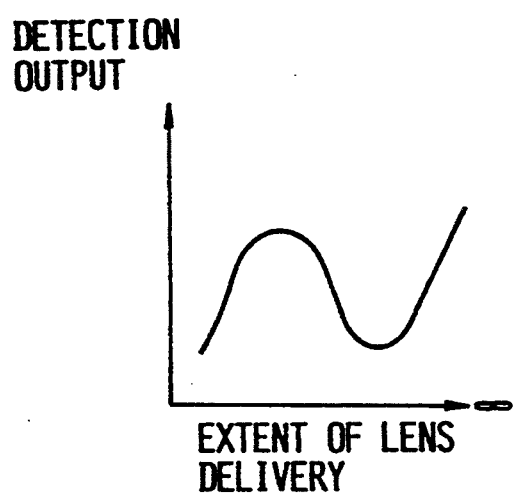
Figure 3E:
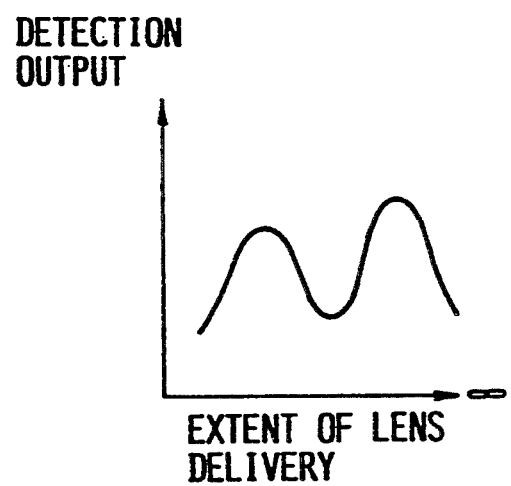
Figure 5:
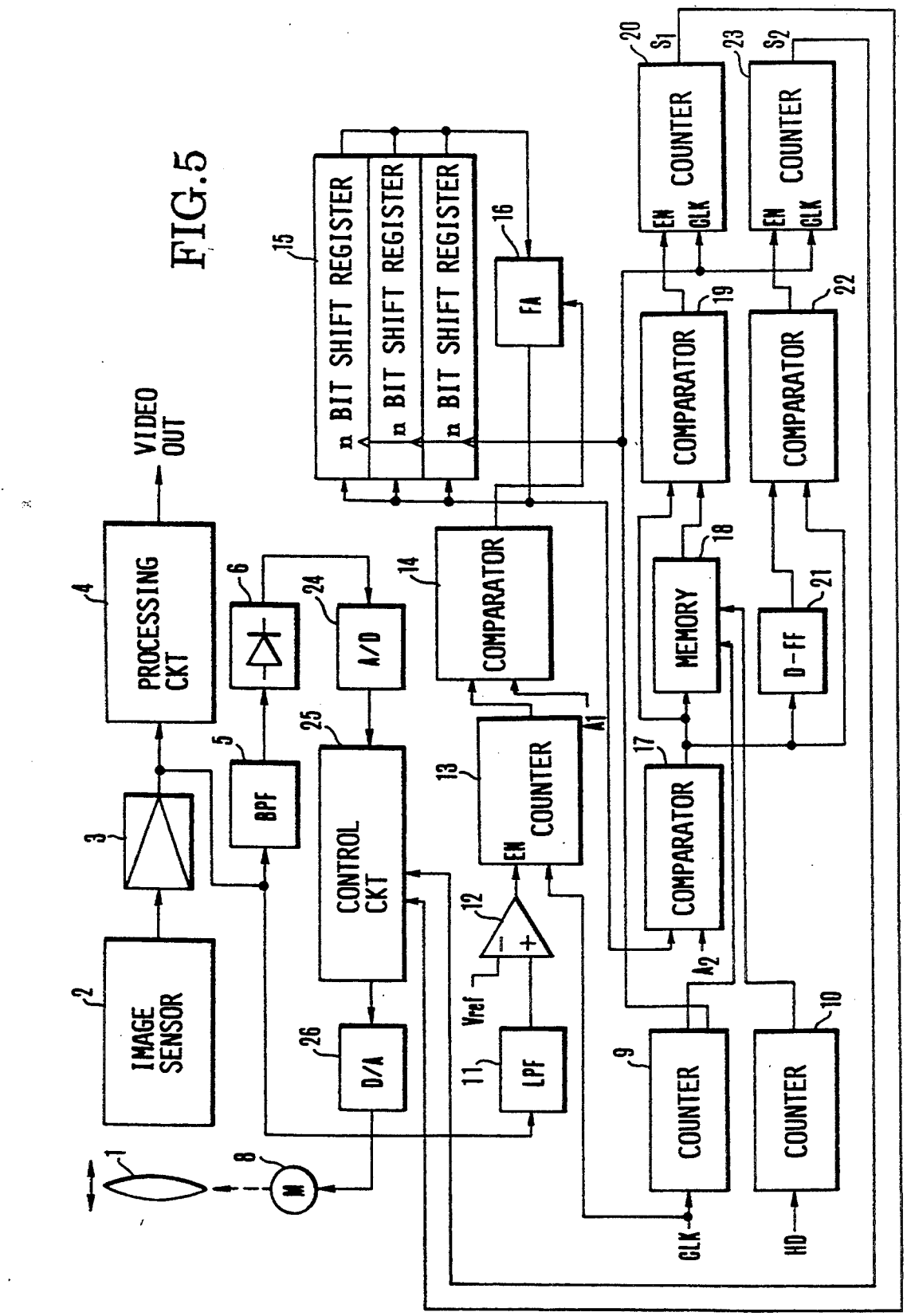
FIG. 5 is a block diagram showing an automatic focusing device arranged as a first embodiment of this invention.

In the following, the details of this invention will be described through embodiments thereof with reference to the accompanying drawings:

FIG. 5 is a block diagram showing an automatic focusing device arranged according to the invention as a first embodiment thereof. In the drawing, the same component parts as those of the conventional device shown in FIG. 1 are indicated by the same reference numerals and the details of them are omitted from description. Further, this invention is arranged to equally divide an image sensing plane vertically into m parts and horizontally into n parts to obtain a total of m×n divided areas as shown in FIG. 6 and to detect camera shake on the basis of the averaged luminance level obtained in each of the areas.

Figure 6:
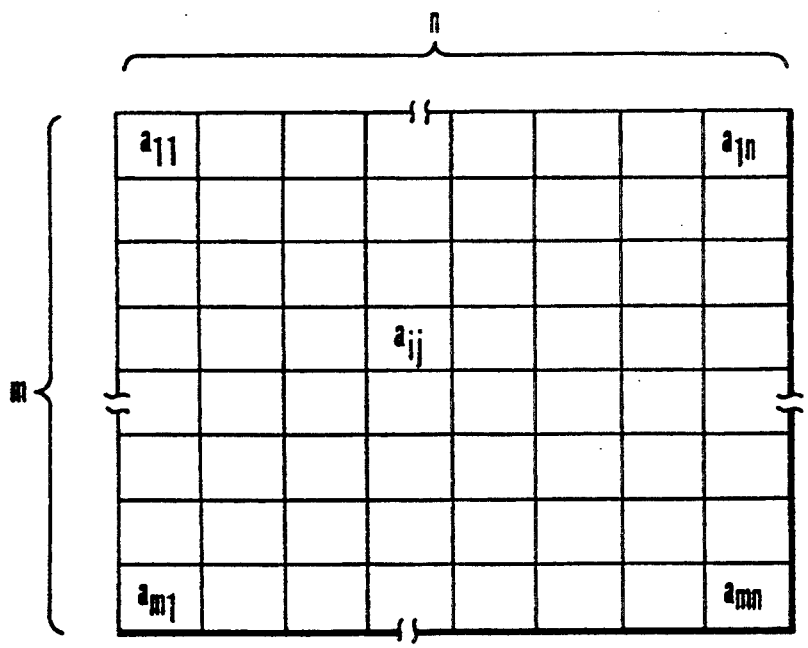
FIG. 6 shows an image sensing plane as in a state of being divided into a plurality (m×n) of areas.

Referring to FIG. 5, a counter 9 is arranged to count a clock frequency CLK and to generate addresses 1 to n in the horizontal direction for each of the areas arranged on the image plane as shown in FIG. 6. A counter 10 is arranged to count a horizontal sync pulse HD and to generate addresses 1 to m in the vertical direction of each of the areas. A low-pass filter (hereinafter referred to as LPF) 11 is arranged to remove an unnecessary high frequency component included in the output of a preamplifier 3. A comparator 12 is arranged to compare the output of the LPF 11 with a predetermined reference voltage Vref and to produce a high level output when the former is larger than the latter. A counter 13 is arranged to count the clock frequency CLK only when the output of the comparator 12 is at a high level. A comparator 14 is arranged to compare the output, i.e. a counted value, of the counter 13 with a predetermined reference value A1 and to produce a high level output when the former is larger than the latter. A shift register 15 is provided with n bits for expressing an n number of data corresponding to the areas which are divided in the horizontal direction on the image plane as shown in FIG. 6. The shift register 15 is arranged to have these bits shifted by one bit every time a scanning or reading action on the image plane shifts from one of the divided areas to another. The n number of data are covered once in rotation for every horizontal scanning line on the image sensing plane (or image plane) as shown in FIG. 6. The shift register 15 is composed of an l number of n-bit shift registers. In the case of this embodiment, l=3. The reason for having the l number of or three n-bit shift registers is as follows: The n bits of each register correspond respectively to the n areas on the image sensing plane. Every time scanning or reading area changes from one area over to another in the horizontal direction, the positions of the shift registers are simultaneously shifted by one bit. The registers are arranged in such a way as to form an l number of places which are weighted for every area.

Meanwhile, the number of times for which the output level of the comparator 14 becomes high is counted by the l (three) bits. An adder 16 is arranged to add "1", when the output level of the comparator 14 becomes high for one of the divided areas, to a counter of the shift register 15 which corresponds to that area and consists of l bits (l places) in the shift register 15. Therefore, every time a scanning point on the image sensing plane shifts from one area to another, the adder 16 adds "1" if the output of the comparator 14 is then at a high level. By this, the position of the shift register 15 is shifted by one bit in the horizontal direction to use the shifted bit as a bit corresponding to a next area. After that, the register is shifted by one bit every time the scanning area changes from one area over to another in the horizontal direction. When one horizontal scanning line on the image sensing plane which is as shown in FIG. 6 has been completely scanned in this manner, one rotation of operation of the shift register also comes to an end. Then a next horizontal scanning line begins to be scanned. Meanwhile, "1" is added for each of the divided areas if the output of the comparator 14 is at a high level. When all the horizontal scanning lines defining the divided areas in the vertical direction have been completely scanned in this manner, each of an n number of counters (provided for each of l places) of the shift register stores information on the number of times (the number of horizontal scanning lines in the vertical direction) for which the output level of the comparator 14 becomes high.

A comparator 17 is arranged to compare the output of the adder 16 with a predetermined reference value A2 and to produce a high level output when the former is larger than the latter. An m×n bit memory 18 is arranged to store therein one field portion of binary coded information for every one of the m×n areas. The binary coded information is obtained by obtaining the output of the comparator 17 in a binary state for every area according to whether the output is at a high level or at a low level on the basis of timing generated by the counters 9 and 10. A comparator 19 is arranged to compare data for a preceding field stored by the memory 18 with the data of a currently processed field. A counter 20 is arranged to count a clock signal generated for each area by the counter 9 only when the output of the comparator 19 is at a low level. A D-type flip-flop (hereinafter referred to as D-FF) 21 is arranged to hold one horizontal area portion of the output (binary coded information) of the comparator 17. A comparator 22 is arranged to compare the binary coded information on an immediately preceding area which is obtained from the D-FF 21 with the binary coded information on the current area. A counter 23 is arranged to count a clock signal which is generated for each area only when the output of the comparator 22 is at a low level. Therefore, from the counter 20 is produced a signal S1 which is indicative of the degree of changes taking place on the basis of a difference in the luminance level of the image sensing plane between the current field and the preceding field. From the counter 23 is produced a signal S2 which is indicative of the overall degree of a change taking place in the current field on the basis of a difference in the high frequency component between adjacent areas on the image sensing plane. An A/D (analog-to-digital) converter 24 is arranged to convert the output of the detector 6 into a digital value. A control circuit 25 which is comprised of a CPU, a ROM, a RAM, etc. is arranged to perform overall control over the whole automatic focusing device by controlling the lens driving motor 8 on the basis of the result of a computing operation on the outputs of the counters 20 and 23. A D/A (digital-to-analog) converter 26 is arranged to convert the output of the control circuit 25 into an analog signal and to supply the analog signal to the motor 8.

Figure 7:
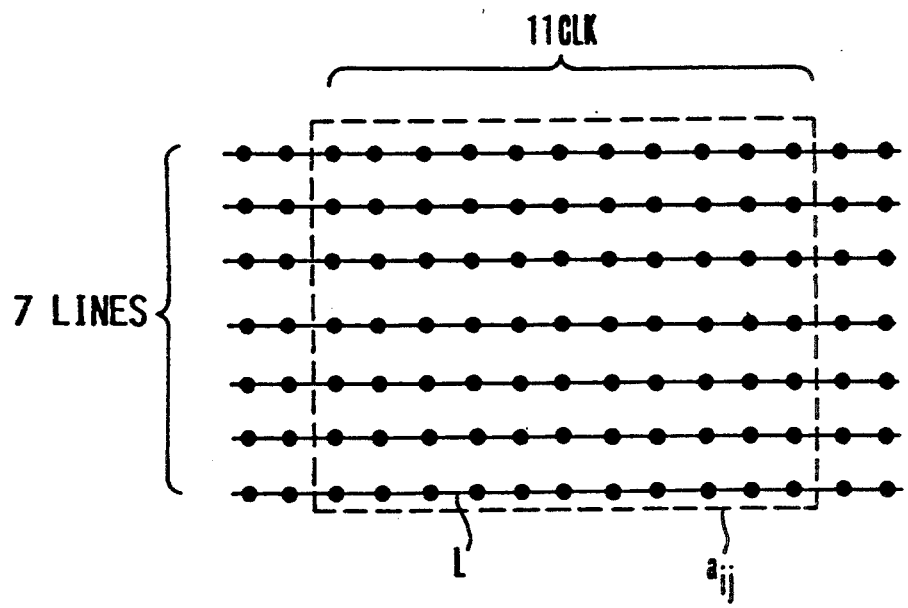
FIG. 7 shows the arrangement of each individual area obtained by dividing the image sensing plane.

The automatic focusing device which is arranged according to the invention as described above operates as described below in sequence of steps:

As shown in FIG. 6, each of the divided areas of the image sensing plane of the image sensor has an address aij assigned thereto. In the address aij, i represents one of 1, 2, ---, m, and j represents one of 1, 2, ---, n. The counter 9 which is provided for generating the horizontal addresses and the counter 10 which is provided for generating the vertical addresses generate the addresses of the divided areas of the image sensing plane accordingly as the image sensing plane is scanned. Assuming that the image plane shown in FIG. 6 is divided into 32 both in the vertical and lateral directions with m assumed to be 32 and n to be also 32, a clock signal to be supplied to the counter 9 is set at a frequency 2 fsc which is two times as high as the subcarrier frequency; and the horizontal sync signal or pulse (hereinafter referred to as the signal HD) is supplied as a clock signal to the counter 10. Each of the divided areas is thus arranged to have, for each field, 11 clock pulses in the transverse direction and seven horizontal scanning lines in the vertical direction as shown in FIG. 7.

The comparator 12 compares a signal obtained by removing an unnecessary high frequency component from the output of the preamplifier 3 through the LPF 11 with the reference voltage Vref. The comparator 12 produces a high level signal when the output of the LPF 11 is found to be above the reference voltage Vref. The reference voltage Vref is set at an intermediate value of the video signal which is, for example, a voltage corresponding to IRE 50%. The output of the comparator 12 thus becomes a value obtained by binary-coding the video signal according to whether the video signal is larger or smaller than its intermediate value.

The counter 13 is enabled when the output level of the comparator 12 becomes high to cause the level of the enable terminal EN of the counter 13 to become high. The counter 13 then comes to count the clock signal CLK which is at the frequency 2 fsc. The counter 13 is reset every time a scanning point on the laterally divided areas changes from one area over to another during its counting action on the clock signal of the frequency 2 fsc. The counter 13, therefore, comes to produce the number of clock pulses (=2 fsc) of the clock signal received for each of the laterally divided areas while the high frequency component of the video signal is above the reference voltage Vref. The comparator 14 compares the output of the counter 13 with the reference value A1. Since 11 clock pulses of the clock signal of frequency 2 fsc exist within each of the m×n divided areas as shown in FIG. 7, the reference value A1 is arranged to be at a value exceeding one half of the clock pulses and is set at, say, 6. In other words, with 11 clock pulses within each area, the number of clock pulses obtained when the luminance level of the video signal is higher than the reference voltage is counted. Therefore, if the luminance level of the video signal is higher than the reference voltage Vref throughout one whole area in the horizontal or lateral direction, a maximum number of 11 clock pulses is counted. In this manner, the comparator 14 produces, for every one of the areas existing in each horizontal scanning line, information in a binary state according to whether the the counted value of a high luminance component is above the reference value A1. The output of the comparator 14 which is thus produced is supplied to the adder 16 to be stored at the shift register 15.

As mentioned in the foregoing, the shift register 15 is composed of an l number of shift registers of n bits which correspond to the number of laterally divided areas of the image sensing plane. In addition to that, counters of l planes (or l bits) are formed for the n number of areas obtained by laterally dividing the image sensing plane. The shift register 15 receives the clock signal which rises every time the horizontal scanning point changed from one area over to another among the n areas. Concurrently with the change-over of the horizontal scanning point, the l number of shift registers are laterally shifted one by one to complete one shifting rotation for every horizontal scanning line. The adder 16 has "0" added thereto if the output of the comparator 14 is at a low level, and "1" added thereto if the output of the comparator 14 is at a high level. Then, the counted value of an l-bit counter corresponding to the applicable area is incremented to renew the data of the shift register 15. The output of the comparator 14 is eventually stored by the n number of counters corresponding to each of the divided areas in such a way as to indicate how many times the level of the output becomes high as a result of scanning each divided area (seven horizontal scanning lines). Further, the data of the shift register 15 is reset every time the scanning area changes from one vertically divided area over to another. Referring to FIG. 7, at a point of time when the scanning of a horizontal scanning line L which is immediately before the change-over from one vertically divided area to another comes to an end, the adder 16 produces and supplies to the comparator 17 such data that indicates how many times the output level of the comparator 14 has become high as a result of scanning of all the horizontal scanning lines within each of the divided areas. Further, in the case of this embodiment, the image sensing plane is divided by 32 both in the vertical and lateral directions with each of the divided areas arranged to have 11 clock pulses and seven horizontal scanning lines. In other words, each divided area is arranged to have a total of 77 sampling points. Therefore, the shift register 15 required to supply data of 32 bits (n=32) to the adder 16 in the amount corresponding to seven horizontal scanning lines. To meet the requirement, the adder 16 must be arranged to have three bits and the shift register 15 to have three columns (l=3).

The output of the adder 16 which indicates how many times the output level of the comparator 14 has become high within each divided area is supplied to the comparator 17 to be compared with the reference value A2 as mentioned in the foregoing. In this instance, the comparator 17 is arranged to find, as a result of a scanning process on each of the divided areas, whether or not the number of horizontal scanning lines having more clock pulses counted by the counter 13 than half of the 11 clock pulses shown in FIG. 7 thus indicating that the high frequency component above a given value is exceeding the reference value A2. With each of the divided areas arranged to have seven horizontal scanning lines, the reference value A2 is set at 4 which is more than half of the seven scanning lines.

The level of binary output of the comparator 12 becomes high or low according to whether the high frequency-component of the video signal is above or below the reference voltage Vref within each divided area which is as shown in FIG. 7. The comparator 17 produces "1" as information on one of the divided areas only when the number of such horizontal scanning lines that have clock pulses obtained in a greater number, with the output level of the comparator 12 having become high, than half of the horizontal total number of clock pulses (11) comes to exceed half of the vertical total number (7) of the horizontal scanning lines. If not, the comparator produces "0". The comparator 17 thus produces its output in the form of binary information for each of the divided areas one by one. Assuming that the information on each area is assumed to be bij, the information bij approximately indicates whether the average value of the luminance level within one area aij is larger or smaller than the average luminance level of the whole image plane, for example, IRE 50%.

The binary information bij on each divided area is stored in the memory 18 of m×n bits for each field one after another and is read out after one or several fields. The comparator 19 then compares the binary information on each area with information obtained for the current field. When the data (or information) of the preceding field is found to differ from that of the current field at any area, the counter 20 is brought into enabled state at that area. Meanwhile, to the counter 20 is applied a clock signal which rises once for every one of the m×n divided areas. The counter 20 is allowed to count the clock signal only when it is enabled by the output of the comparator 19. Therefore, the counted value of the counter 20 is incremented by one every time an area for which the data stored in the memory 18 is found to be different from the data of the current field. A total of the counted values obtained in this manner for the whole image sensing plane is eventually produced as a signal S1. Assuming that the binary information on each of the areas obtained a one- or several-field period before is bij', the signal S1 produced from the counter 20 represents a total difference of the binary information bij' of the preceding field from the binary information bij of the current field, Therefore, the signal S1 can be expressed as follows:

$$S1 = \sum_{i=1}^{m} \sum_{j=1}^{n} |bij - bij'| \qquad (1)$$

The value of the signal S1 therefore varies with the varying degree, i.e. the blurring degree, of the image sensing plane. The signal S1 also varies when only a small part of the image plane, such as a man, moves within the image plane even while the image plane as a whole remains unchanged. If the lens is focused on such a moving object within the image plane, the object distance from the camera might vary to bring the lens out of focus. Therefore, unlike in the case of movement of the whole image plane due to camera shake, the automatic focusing device does not have to be stopped from operating to keep the focus on the object in that instance. If the automatic focusing operation is brought to a stop under such a condition, the camera would have almost no possibility of coming in focus on the moving object. Such arrangement would be rather undesirable.

To solve this problem, the embodiment eliminates the possibility of the above stated faulty operation by making a discrimination between a movement of the object and a movement of the whole image plane due to panning or camera shake. For this purpose, the embodiment uses data which is obtained relative to the complex state of the whole image plane by means of a D-FF 21, a comparator 22 and a counter 23. Referring to FIG. 5, the D-FF 21 is arranged to be triggered by a clock signal which rises every time the scanning point changes from one divided area over to another in the lateral direction. The binary information on each of the n×m divided areas produced from the comparator 17 is held by the D-FF 21 for each area in the horizontal scanning direction. The data output of the D-FF 21 is compared with the data output of the comparator 17 by the comparator 22. Then, the counter 23 is enabled for any area for which the two data outputs show a difference between them. Like the counter 20, the counter 23 is receiving a clock signal which rises every time the horizontal scanning point changes from one area over to another. The counter 23 is thus allowed to count the clock signal to have its counted value incremented by one only when it is enabled by the output of the comparator 22. The counter 23 then eventually comes to produce a signal S2. The signal S2 is a function which varies according to information on a difference between adjacent areas within one field image plane representing the complexity or cluttered degree of the whole image plane and can be expressed as follows:

$$S2 = \sum_{i=1}^{m} \sum_{j=2}^{n} |bij - bi(j-1)| \tag{2}$$

The signal S2 represents a total difference in the binary information bij occurred among the divided areas of the whole image plane showing a difference of one area from another adjacently located on the left side thereof.

The signal values S1 and S2 which are obtained in the manner described above are computed by the control circuit 25 of FIG. 5 according to the following formula:

$$S = S1/S2 \tag{3}$$

A value S which ultimately indicates changes taking place in the image plane is obtained by this computation.

In other words, this value S is obtained by normalizing variations and differences occurring in the image plane between different fields with the cluttered degree of the image plane. Therefore, the embodiment is capable of eliminating the adverse effects of the inconstant degree of variations resulting from a difference between fields in the cluttered degree of the image plane. This is an advantage, because: A difference in the degree of the cluttered degree of the whole image plane causes a salient change in the value S1 even under the same blurring condition. Whereas, with the value S1 normalized with the value S2 which represents the cluttered degree of the image plane enables the automatic focusing device to detect always an actual changes irrespective as to whether the image plane is monotonous or cluttered up. Therefore, if the whole image plane changes in the horizontal direction more than one divided area the extent of the change is expressed by a value which is more than 1.

Further, in case that only a part of the image plane moves while the image plane as a whole is not changing, the changing degree of the whole image plane is small relative to the cluttered degree of the image plane. In such a case, a relation of S1 < S2 probably takes place to cause the value of S of Formula (3) to become less than 1. Therefore, the control circuit 25 is arranged to find whether the value S exceeds 1 or is less than 1. If the value 1 is found to be above 1, the automatic focusing action is brought to a stop. If it is found to be less than 1, the automatic focusing action is allowed to continue. This arrangement thus effectively prevents any faulty action from being caused by panning or by the movement of the whole image plane due to camera shake.

In obtaining the value S2 indicating the degree of a cluttered state of the image plane, the embodiment is arranged to obtain it by comparing the values of the binary information bij on the laterally adjacent areas. The reason for this arrangement: In an automatic focusing device, the video signal to be used for finding an in-focus state is obtained by horizontally scanning the image plane. Therefore, a signal component in the vertical direction of the image plane is seldom used for that purpose. A vertical or tilting movement of the camera is thus regarded as unimportant and the degree of a cluttered state in the vertical direction is also considered to be not important.

However, in accordance with this invention, occurrence of any slight vertical change can be adequately coped with. In a case where a component detecting method corresponding to the method of detecting the edge of an image plane and a high frequency component in the vertical direction which is disclosed, for example, in Japanese Patent publication No. SHO 62-38083 is employed, the above stated tilting movement also must be taken into consideration. In such a case, therefore, the embodiment is capable of adequately coping also with a vertical change by performing a computing process using a value S3 or detecting the binary information on the vertically divided areas. The value S3 can be expressed as follows:

$$S3 = \sum_{i=2}^{m} \sum_{j=1}^{n} |bij - b(i-1)j| \tag{4}$$

Further, the embodiment described is arranged to decide whether or not the automatic focusing action is to be brought to a stop by determining the largeness or smallness of the value S of Formula (3) on the basis of "1". However, this basis does not have to be "1". For example, the arrangement may be changed to vary the reference value according to changes in the angle of view such as changes in the zooming state of a zooming lens or the like. It is also possible to vary the reference value according to the number of divided areas on the image plane. The invention thus allows design latitude as necessary.

In the device arranged according to the invention as described in the foregoing, the luminance level of each of a plurality of areas set on the image sensing plane is expressed in a binary information value. Then, any movement or changes taking place on the image plane is detected by comparing the binary information value of each area obtained for one field with the binary information value of the same area obtained for another field. In addition to that, an automatic focusing action is arranged to be controlled on the basis of a value obtained by normalizing the result of the detection with the degree of the cluttered state of the image plane. This arrangement enables the device to accurately find whether a change in the image plane is caused by a movement of the whole image plane like in the case of camera shake or caused by a partial movement thereof like a movement of the main object without being affected by a difference between a monotonous state of the image plane and a cluttered up state thereof. In the case of the camera shake, the lens is prevented from coming out of focus by bringing the focusing action to a stop. In the event of a movement of the main object or the like, the focusing action is allowed to be continued. Therefore, when applied to a video camera or a like video apparatus which is to be operated usually in a state of being held by hand, the embodiment advantageously prevents a faulty operation which otherwise results from camera shake, panning or the like.

In accordance with the method employed by the first embodiment described in the foregoing, information on each of the divided areas obtained by dividing the image sensing plane vertically by m and laterally by n into an m×n latice-like state is obtained in a binary value. The binary information value of each area obtained for one field is compared with that of the same area obtained for another field to detect any movement taking place between the two fields. The total of such movements is obtained for the whole image plane in the form of the signal value S1. Further, the value S1 is normalized with another value S2 which represents the cluttered degree of the whole image plane. By this, the value S1 is normalized into a value S which represents the degree of any change of the image plane without being affected by the cluttered degree of the image plane. In the event of camera shake or panning which results in the movement of the whole image plane, the value S which represents a changing degree varies exactly in proportion to the degree of lateral movement of the image plane without being affected by the cluttered degree thereof. In cases where the object which occupies a part of the image plane-moves alone while the image plane remains in repose as a whole, the value S1 which represents a change occurring in the binary information between different fields becomes small relative to the value S2 which represents the cluttered degree of the image plane. In that event, the normalized value S also becomes small.

The value S thus varies according to whether the whole image plane is moving due to introduction of hand vibrations to a camera or panning or an object occupying a part of the image plane is moving even if the degree of the former movement is equal to that of the latter. Therefore, camera shake or panning is detectable by utilizing this difference in the value S.

However, further studies have revealed that the method described above has been found to have room for further improvement. In other words, the method described in the foregoing has been found to have the following problem: In case that an object occupying a part of the image plane comes to move to a great extent at a high speed against a background which is monotonous thus allowing the whole image plane to be not much cluttered, the value S1 increases to a relatively great degree. The value S becomes too large even after normalization of the value S1 with the value S2. As a result, the movement of the object becomes hardly distinguishable from a movement due to camera shake or panning. Further, even in cases where the background is not monotonous, if an object occupying a relatively large portion of the image plane moves to a great extent at a high speed, the value S also becomes too large to permit an accurate discrimination from camera shake or panning.

A second embodiment of this invention is arranged to solve the above stated problem. The second embodiment is capable of accurately making a discrimination between the movement of the camera and that of an object occupying a portion of the image plane without being affected by the monotony of the image plane and the size of the portion of the image plane occupied by the object. To attain this capability, the second embodiment is arranged to find changes occurring in the image plane by comparing the edge or contour of an image within one field image plane with that of another field image plane instead of finding a difference in luminance distribution of the image plane between different fields.

Figure 8:
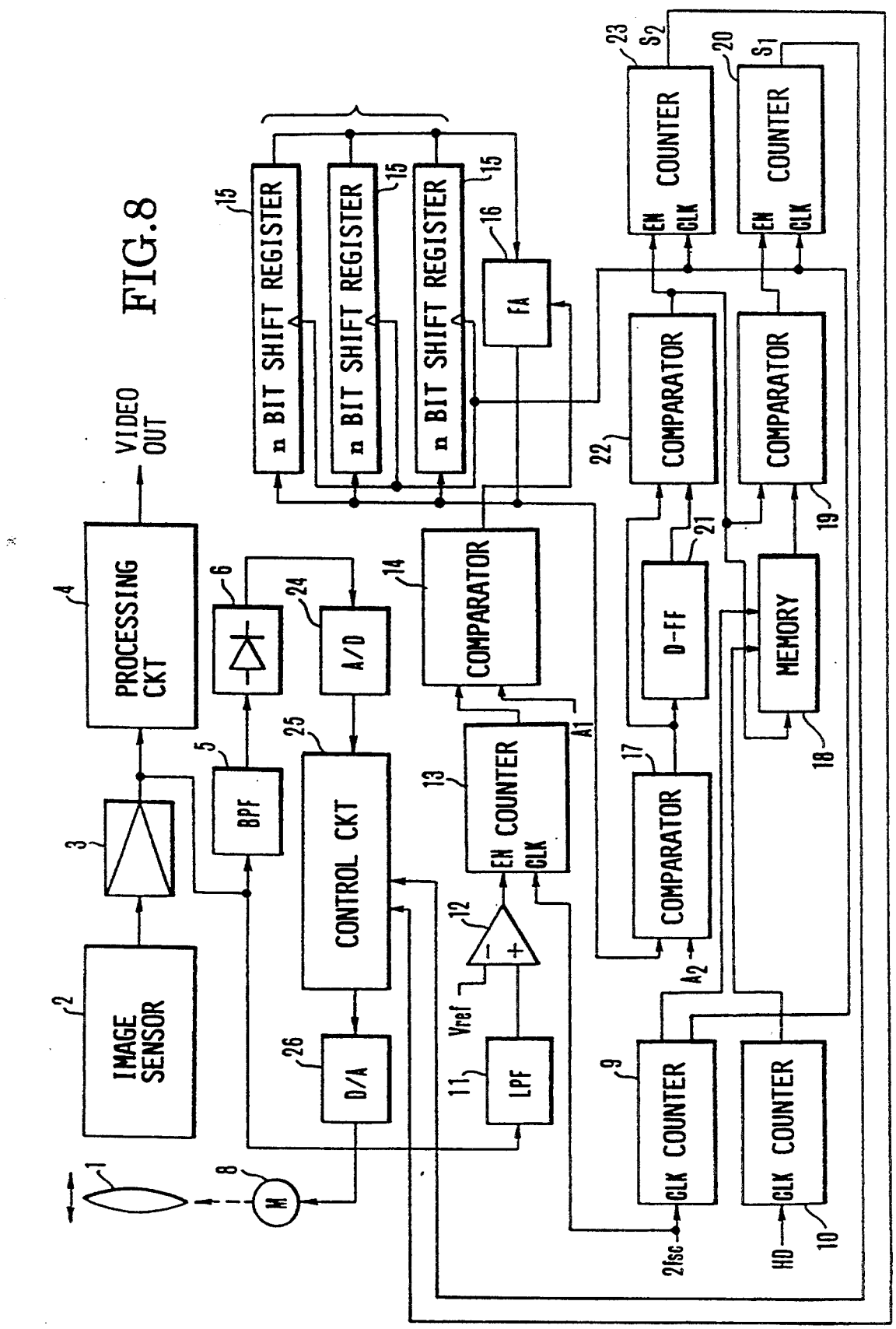
FIG. 8 is a block diagram showing a second embodiment of the invention which is an improvement on the first embodiment.

FIG. 8 shows the second embodiment in a block diagram. In FIG. 8, the same component parts as those of FIG. 5 are indicated by the same reference numerals and the details of them are omitted from the following description. The illustration includes a photo taking lens 1, an image sensor 2, a preamplifier 3, a processing circuit 4, a band-pass filter 5, a detection circuit 6, an A/D converter 24, a D/A converter 26, a lens driving motor 8, a control circuit 25 for controlling the automatic focusing system, a low-pass filter 11, a comparator 12, a counter 13, a comparator 14, a shift register 15, an adder 16, counters 9 and 10 and a comparator 17. These component parts are arranged in the same manner as in the case of the first embodiment.

This embodiment differs from the first embodiment in the following point: In the case of the first embodiment which is arranged as shown in FIG. 5, the degree of movement of an image is detected by storing within the memory 18 the binary information on every one of m×n divided areas of one image plane; by comparing the binary information with that of the image plane of the preceding field; and by obtaining a total value S1 of movements or changes taking place between the two field image planes. Whereas, in the second embodiment, the output of a comparator 22 is supplied to the memory 18. Binary values of information on difference between adjacent areas of the image plane obtained from the whole image plane through the comparator 17, a D-FF 21 and the comparator 22 are thus stored in the memory 18. Then, the values of differences between adjacent areas on the current field image plane are compared with the values stored at the memory 18. A value S1' representing the moving degree of an image is obtained from the result of the comparison.

The above stated process of obtaining a difference value between divided areas on the image plane means detection of any part that changes from "1" to "0" or from "0" to "1" on the image plane and an action of comparing the edge parts or contours of an image obtained on the current field image plane and a previous field image plane. Therefore, even in cases where the object moves to a great extent against a monotonous background or where the change in the binary information on the whole area of the image plane become large due to a large size of the object, the second embodiment is capable of extracting and comparing only the contours of the object appeared on the different field image planes with each other. Therefore, the adverse effects of errors in the detected movement obtained on the basis of the area or size of the object can be minimized. Any movement of the object, therefore, can be accurately detected without enlarging the error by making the value of S1' unnecessarily large. This point is described in detail below:

The binary information value bij for every one of the m×n divided areas aij on the image plane is held by the D-FF 21 in an amount corresponding to one horizontally divided area. This holding action is performed on the horizontal scanning line L (see FIG. 7) from which the binary information on each area is obtained. The binary information value which is held for one area is compared by a comparator 22 with a binary information value for another area located in the horizontal direction. More specifically, the comparator 22 is arranged to produce a difference value cij between areas laterally adjacent to each other among the divided areas as shown in FIG. 6. In the binary difference value cij, the symbol i represents any of 1, 2, - - - and m, while the symbol j represents 1, 2, - - - and n−1 as applicable. The difference value cij can be expressed as follows:

$$cij = |bi(j+1) - bij| \qquad (5)$$

The horizontal difference values cij of the binary information bij on each of the divided areas are stored in an amount covering one image plane by the memory 18. The stored difference values are read out after the lapse of a period of one or several fields. Then, a comparator 19 compares each of the stored values with the binary information difference value of each applicable area of the current field image plane. The comparator 19 produces a low level output when the stored binary information difference value between adjacent areas stored in the memory differs from the binary information difference value between adjacent areas of the current field. The low level output of the comparator 19 brings a counter 20 into an enabled state. To the clock input terminal of the counter 20 is applied a clock signal which rises once for every one of the divided areas. The counter 20 is thus arranged to have its counted value incremented by blocks (or areas) only when the output of the comparator 19 is at a low level. After completion of one field, the output of the counter 20 becomes a total difference obtained from blocks (areas) between the binary information difference value cij' of a field immediately preceding the current field and the binary information difference value cij of the current field. Assuming that the output of the counter 20 is S1', the value S1 can be expressed as follows:

$$S1' = \sum_{i=1}^{m} \sum_{j=1}^{n-1} |cij - cij'| \qquad (6)$$

This value S1' varies with the degree of changes taking place in the image plane. In other words, it varies in proportion to the degree of camera vibrations.

Another counter 23 is arranged to have its count incremented only when the output of the comparator 22 is at a low level by the clock signal which is applied thereto in the same manner as the counter 20. Therefore, when one field comes to an end, the output of the counter 22 becomes a total of all the binary information difference values obtained for the current field. Assuming that the output of the counter 23 is S2', the output can be expressed as follows:

$$S2' = \sum_{i=1}^{m} \sum_{j=1}^{n-1} cij \qquad (7)$$

The value S2' represents, like in the case of the first embodiment, the cluttered degree of the image plane and is identical with the value of Formula (2).

The outputs S1' and S2' which are obtained in the above stated manner are supplied to the control circuit 25. Then, the control circuit 25 performs a computing operation on them to obtain a value S', which represents the ultimate degree of changes taking place in the image plane and can be expressed as follows:

$$S' = \frac{S1'}{S2'} \qquad (8)$$

The value S' which is obtained in the above stated manner is a value obtained by normalizing, with the cluttered degree of image plane, a change which is found to have occurred at the edge part of an image of one field image plane from the same image of another field image plane. The value S', therefore, represents a normalized amount of change taking place in the image plane and is obtained without being affected by a degree of changes resulting from a cluttered state of the image plane. This is the same advantage as that of the first embodiment. In other words, the value S1' would greatly fluctuate under the same blurring condition, according to variations in the cluttered degree of the image of the whole image plane. Whereas, the above stated normalization with the cluttered degree S2' of the image plane enables the embodiment to accurately detect only an actual change of the image irrespective as to whether the image plane is monotonous or cluttered. The degree of change thus detected becomes larger than "1" in case that the whole image plane comes to horizontally change to an extent exceeding one laterally divided area thereof.

The most salient feature of the second embodiment is as follows: Even in cases where the background of the image plane is monotonous and an object occupying a portion of the image plane makes a quick motion, the value S1' remains almost unvarying without being affected by the size of the object or the extent of its movement, because: In accordance with Formula (8), the degree of change in the object's image is obtained through the horizontal difference value between binary information values, i.e. values of information on the contour part of the image. The detected value does not much fluctuate according to the state of the object, so that the accuracy of detection can be prevented from lowering. The value S1' also little fluctuates in cases where an object's image which occupies a large portion of the image plane comes to quickly move to a large extent.

The control circuit 25 is arranged to make a discrimination between the movement of an object's image occupying a part of the image plane and the movement of the whole image plane on the basis of the value S'. The control circuit 25 then controls the automatic focus adjusting action accordingly. The control is performed in the same manner as in the case of the first embodiment.

More specifically, the whole-image-plane changing degree S1' is at a small value in cases where an object's image occupying a part of the image plane moves alone while the image plane as a whole remains unchanged. Then, since the cluttered degree of the image plane remains unchanged, the value S' of Formula (8) is small.

In the event of camera shake which causes the whole image plane to move, the value S1' representing the changing degree of the whole image plane increases. This causes the value S' of Formula (8) to increase.

Therefore, the value S' is compared with a preset given value Sr. The control circuit 25 considers any change occurred in the image plane to be a movement of the whole image plane due to camera shake or panning if the value S' is found to be not less than the given value Sr; and to be a solo movement of the object if the value S' is found less than the given value Sr. The control circuit 25 brings the automatic focusing action to a stop by causing the motor 8 to come to a stop in the case that the value S' is not less than the given value Sr and allows the automatic focusing action to continue if the value S' is less than the value Sr.

In the second embodiment, the value S2' which represents the cluttered degree of the image plane is obtained by performing the comparing action on the basis of a difference in the binary information between areas which are laterally adjacent to each other. In the event of vertical movement of camera like in the case of tilting or the like, it is conceivable to use like in the case of the first embodiment a difference value dij (wherein i represents any of 1, 2, - - - and m−1, and j represents any of 1, 2, - - - and n) between the binary information values of vertically adjacent areas. Referring again to the illustration of the image sensing plane of FIG. 6, the second embodiment can be arranged to cope also with a vertical change (tilting) through a computing operation performed in accordance with the following formulas:

$$dij = |b(i+1)j - bij| \qquad (9)$$

$$Sv1 = \sum_{i=1}^{m-1} \sum_{j=1}^{n} |dij - dij'| \qquad (10)$$

$$Sv2 = \sum_{i=1}^{m-1} \sum_{j=1}^{n} dij \qquad (11)$$

$$Sv = \frac{Sv1}{Sv2} \qquad (12)$$

(wherein dij' represents the value of dij obtained for a field immediately preceding the current field.)

In other words, the value $Sv$ is obtained by normalizing the value $Sv1$ which represents the degree of a change taking place in the vertical direction with the value $Sv2$ which represents the cluttered degree of the image plane. The output thus obtained is compared with a given reference value Sr'. Then the relative largeness or smallness of the value $Sv$ thus determined enables the embodiment to make a discrimination between a movement of an object's image occupying a part of the image plane (the value $Sv1$ is small and $Sv$ is less than Sr') and a movement of the whole image plane due to camera shake (the value $Sv2$ is small and $Sv$ is not less than Sr'). Further, in this instance, the given value Sr' does not have to be an absolutely fixed value but may be arranged to be a reference value which is variable, for example, according to changes taking place in the angle of view such as the changes taking place in the zooming process of a zoom lens. Further, the number of the divided areas of the image plane may be changed as desired in designing the embodiment.

The second embodiment of this invention as mentioned in the foregoing is capable of accomplishing accurate detection, being little affected by the size, moving extent and moving speed of the object, by virtue of the arrangement thereof to compare the contour part of an image appearing on one field image plane with that of the same image appearing on another field image plane.

In the foregoing, the first and second embodiments have been described as arranged to control an automatic focusing action by dividing an image plane into $m \times n$ areas; by detecting any movement of the image on the basis of binary information on the luminance level of each of the divided areas; and by making a discrimination between a movement of the whole camera due to camera shake or panning and a movement of the object.

Figure 9:
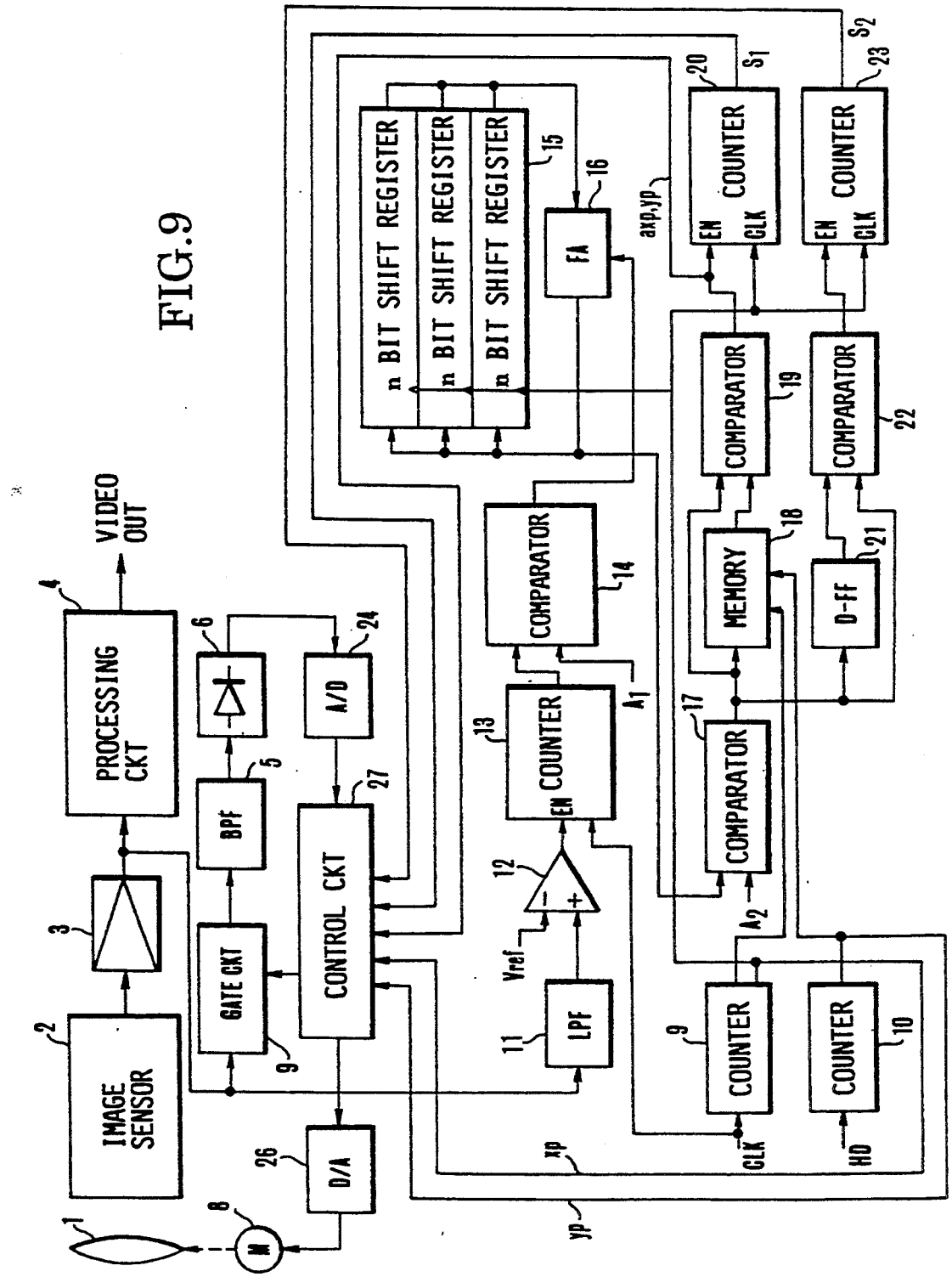
FIG. 9 is a block diagram showing a third embodiment of the invention which is obtained by adding object tracing means to the automatic focusing device of the invention.
Figure 10:
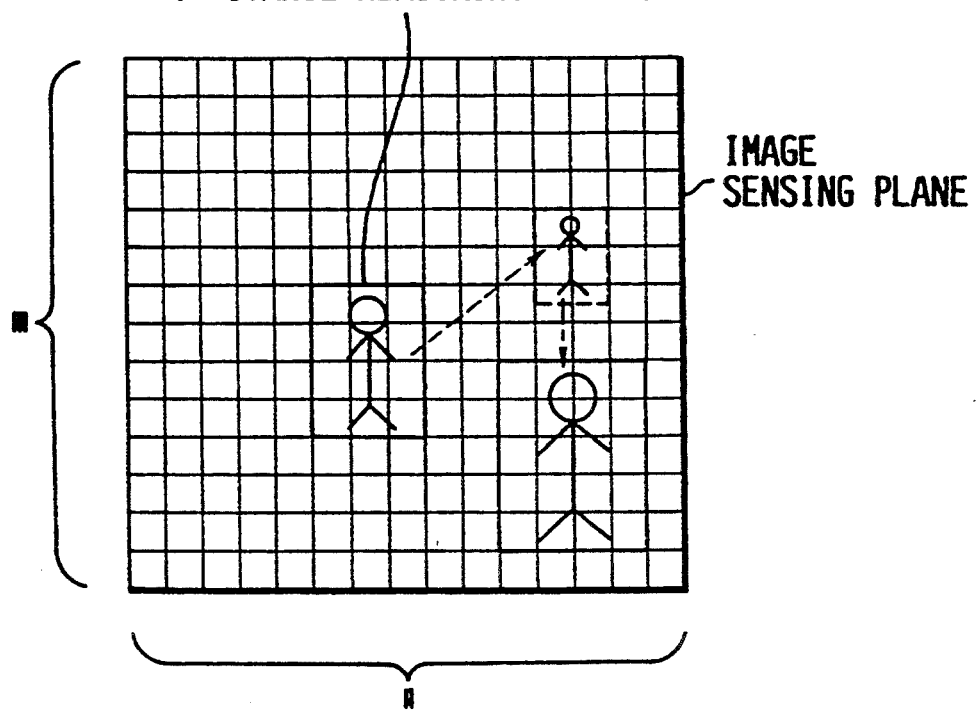
FIG. 10 is an illustration of an operation on the distance measuring frame (focus detecting zone).

A third embodiment of the invention is provided with an image movement detecting means for detecting a movement of the object to be photographed. A distance measuring frame, or a focus detecting zone, is arranged to trace the moving object to keep the camera in focus on the object. FIG. 9 shows the arrangement of the third embodiment in a block diagram. The arrangement for detecting the image movement is identical with that of the first embodiment shown in FIG. 5. In FIG. 9, the same component parts as those of FIG. 5 are indicated by the same reference numerals and the details of them are omitted from the following description:

Referring to FIG. 9, a gate circuit 9 is interposed in between the preamplifier 3 and the band-pass filter 5. With a video signal produced from the image sensor 2 via the preamplifier 3, a portion of the video signal which corresponds to a predetermined zone of the image sensing plane of the image sensor is alone allowed to pass through the gate circuit 9. A distance measuring frame, i.e. a focus detecting zone, is thus set on the image sensing plane by means of this gate circuit 9. The gate circuit 9 opens and closes under the control of a control circuit 27. The control circuit 27 includes a microcomputer and controls the gate circuit 9 on the basis of information on the moving degree and position of an object's image. The distance measuring frame setting position on the image sensing plane is controlled through the control over the gate circuit 9. FIG. 10 shows the distance measuring frame (focus detecting zone) set on the image sensing plane.

The control circuit 27 receives the output of the comparator 19 which compares the value of the binary information on each of the $m \times n$ divided areas of the image sensing plane obtained for a current field with that of the image sensing plane obtained for a preceding field; and signals produced from the counter 9 which is provided for generating horizontal addresses of the $m \times n$ areas and the counter 10 which is provided for generating vertical addresses of the $m \times n$ areas. A memory included in the control circuit 27 is arranged to store some information $a_{xp,yp}$ that indicates the occurrence or non-occurrence of a movement in each of the $m \times n$ areas on the image sensing plane and a position at which the movement is detected. The control circuit 27 detects a movement occurring range, the size thereof, etc. of the image sensing plane from the output of the comparator 19 and the position information thereof. The circuit 27 then sets the position of the distance measuring frame (focus detecting zone) according to the result of detection.

In the case of a video camera which is designed for taking a motion picture, a movement is considered to occur mostly in a part having the object to be photographed. The third embodiment is, therefore, arranged to detect the moving position of the object by image movement detecting means and to trace the moving object by adjusting the position and size of the distance measuring frame or focus detecting zone. Further details of the operation of the third embodiment are as described below:

As mentioned in the foregoing description of the first embodiment shown in FIG. 5, the binary information bij on each of the divided areas which is produced from the comparator 17 is stored one after another in the memory 18 of m×n bits covering one field. The stored information is read out after the lapse of one or several field periods. The read out information on each area is then compared with information on the same area obtained for a current field. The result of comparison is supplied to the control circuit 27. Then, the address of any area for which the data (or information) read out from the memory 18 differs from the corresponding data obtained for the current field is stored. If the camera is not moving, the area having different data can be considered to indicate the presence of a moving object's image which is causing a change in the luminance level of the area of the moving image on the image plane and eventually a change in the binary information. Hence, the position of the area having different binary information values for different fields may be considered to indicate the position of a moving object's image on the image plane.

Generally, a video camera is used for taking the picture of a moving object and, unlike a still camera, is seldom used for taking a still picture. Any moving part within an image plane, therefore, may be considered to represent an object to be photographed. The above stated distance measuring frame which is provided for the purpose of designating an in-focus state obtaining zone is preferably set in a position to include the moving object.

In case that only one area comes to have different binary information values for the two fields used for comparison, the distance measuring frame set with this specific area set in the middle part thereof. However, in the event of a plurality of such areas, the center $a_{x,y}$ of a part including all of these areas is obtained from the following formula with the positions of these areas assumed to be $a_{x1,y1}$, $a_{x2,y2}$, - - - and $a_{xp,yp}$ ($1<P<m,n$):

$$x = \frac{1}{P} \sum_{k=1}^{P} xk; \quad y = \frac{1}{P} \sum_{k=1}^{P} yk \quad (13)$$

The center $a_{x,y}$ thus obtained is set in the middle part of the distance measuring frame (focus detecting zone).

In accordance with the above stated concept, the control circuit 27 controls the gate circuit 9 to have the distance measuring frame set on the image sensing plane in such a position that becomes the center of the movement of a moving object's image.

The size of the distance measuring frame may be arranged to be variable according to the focused state in a manner as disclosed in the Japanese Laid-Open Patent Application No. SHO 61-18271 mentioned in the foregoing. However, in cases where a plurality of areas have varying binary information values for the fields compared, the size of the distance measuring frame can be set to include the range of movements by obtaining maximum and minimum values $X_{max}$ and $X_{min}$ of x1, x2, - - - and xp and maximum and minimum values $Y_{max}$ and $Y_{min}$ of y1, y2, - - - and yp among the positions of these areas $a_{x1,y1}$, $a_{x2,y2}$, - - - and $a_{xp,yp}$; and by horizontally and vertically adjusting the size of the distance measuring frame to the following:

$$X_{max}-X_{min}, \text{ and } Y_{max}-Y_{min} \quad (14)$$

The series of computing operations mentioned in the foregoing are performed in accordance with a stored program by the microcomputer disposed within the control circuit 27. Then, in accordance with the result of the computing operation, the control circuit 27 supplies a gate control signal to the gate circuit 9 for allowing only a portion of the video signal which is within the distance measuring frame to pass through the gate circuit and to be supplied to the band-pass filter 5.

The foregoing description of operation is on the assumption that the camera is kept in repose without being vibrated or moved. However, the video camera is often operated in a state of being held by hand. Then, hand shake tends to be introduced to the camera. In such a case, the whole image plane moves to cause the binary information on an area which corresponds to a stationary object would also come to vary, like the areas of a moving object, when two fields are compared. In that instance, the distance measuring frame would be incorrectly set. To solve this problem, an automatic focusing action and an object following action must be controlled by making a discrimination between a movement of the whole image plane due to camera shake or panning and a movement of an object's image.

As mentioned in the foregoing description of the first embodiment shown in FIG. 5, the counter 20 produces the value S1 of Formula (1) which represents a degree of a change taking place on the image sensing plane, i.e. a total movement of the image plane. The counter 23 produces the value S2 of Formula (2) which represents the cluttered degree of the image plane and is used for normalizing the value S1 which is the moving degree of the image plane. These values S1 and S2 are supplied to the control circuit 27. The control circuit 27 computes and obtains an image plane changing degree S in accordance with Formula (3) by normalizing the value S1 with the value S2 which shows the cluttered degree of the image plane. When the whole image plane changes more than the laterally divided area, the changing degree comes to exceed "1" in the same manner as mentioned in the foregoing. In case that only a part of the image plane occupied by an object's image moves while the image plane as a whole remains stationary, the changing degree S of the whole image plane is expected to become less than the cluttered degree S2 of the image. In that event, the value of the above stated formula becomes less than "1."

Therefore, the control circuit 27 checks the value S of the above stated formula to find whether is above "1". If so, the automatic focusing action is brought to a stop, because it indicates either camera shake or panning. If not, the automatic focusing action is allowed to continue. The embodiment is thus arranged to be capable of preventing a faulty operation from being caused by panning. The control circuit 27 thus operates, according to the value S of Formula (3), to bring the automatic focusing action to a stop by causing the motor 8 to stop and to fix the position of the distance measuring frame in case that the camera is moved by camera shake or panning. In the event of a movement of the object, the control circuit 27 allows the automatic focusing action to continue and causes the distance measuring frame, or the focus detecting zone, to trace the moving object on the basis of the information on the center position and size of the image movement indicated in Formulas (13) and (14). This enables the focusing action to follow the movement of the object. As shown in FIG. 10, the distance measuring frame (focus detecting zone) is shifted in blocks of the divided areas and set in a size suited for the object.

While the image movement detecting means of the third embodiment is arranged in the same manner as in the first embodiment, it may be changed to use information on a difference between adjacent areas like in the case of the second embodiment.

With the third embodiment arranged to operate in the above stated manner, it is capable of accurately detecting a movement of the object and allowing the distance detecting frame to trace the moving object without any faulty operation that might result from mistaking of a camera movement for an object movement.

In the event of detection of a camera movement, the method of suspending the focusing action and fixing, at the same time, the distance measuring frame in a position designated before occurrence of the camera movement may be replaced with a method of shifting the distance measuring frame to the middle of the image plane.

The embodiment described may be arranged to repeat the distance measuring frame setting action by incessantly detecting the movement of the object. However, in the method whereby the object's movement on the image plane is detected on the basis of a luminance difference between the object and the background and the distance measuring frame is allowed to trace the moving object, the distance measuring frame may be set in its initial position according to the distance frame designating method of the invention and the distance measuring frame, thereafter, may be allowed to trace the moving object on the basis of the luminance difference between the object and the background. This arrangement permits the distance measuring frame to be set in the initial position by accurately detecting the object in its initial state, so that the ensuing tracing action can be smoothly carried out.

Further, Japanese Laid-Open Patent Application No. SHO 61-275055 discloses a method wherein: A distance measuring frame is allowed to trace the movement of an object by using the peak value of a high frequency component of the image signal of the object. This invention is applicable to an initial setting action on the distance measuring frame. This invention is thus applicable to a wide range of tracing methods.

Further, the application of the distance measuring frame designating method according to this invention is not limited to automatic focusing devices. This method is applicable, for example, to an arrangement for setting a designated area for spot light measurement in the exposure control functions of varied kinds such as an automatic iris, automatic gain control (AGC), etc. as well as automatic focusing devices.

The automatic focusing device according to the invention, as described in the foregoing, comprises means for obtaining binary information by comparing the luminance level of one area with that of another among a plurality of divided areas arranged on the image sensing plane of image sensing means; detecting means for detecting a change taking place in the binary information by comparing the binary information value of each area obtained for a current field with that of the same area obtained for a field preceding the current field by a predetermined period; and computing means for setting the center position of a distance measuring frame by computing information on the position of the area which is detected by the detecting means to have a change in the binary information. Therefore, the device is capable of detecting only a movement of an object's image taking place on the image sensing plane from the binary information with a high degree of accuracy within the range of the divided areas. The device is capable of accurately tracing a moving object with a high degree of reliability without the fear of a faulty operation due to a depthwise confusion, etc.

What is claimed is:

1. An automatic focusing device comprising:
   a) binary coded information producing means for producing binary coded information by comparing the levels of a predetermined component in each of a plurality of areas set on an image sensing plane of image sensing means with a predetermined value;
   b) first detecting means for comparing binary coded information in each of the plurality of areas in one field with that in another field among a plurality of fields differing timewise from each other to produce a signal based on the difference between the two binary coded information;
   c) second detecting means for detecting a total value, for one image plane, of differences in said predetermined component between adjacent areas among said plurality of areas of said image sensing plane;
   d) computing means for obtaining a degree of relative variations in information on images formed on said image sensing plane in different fields by computing the result of detection made by said first and second detecting means; and
   e) control means for controlling a focus adjusting action on the basis of an output of said computing means.

2. A device according to claim 1, wherein said predetermined component is a luminance signal component in an image signal outputted from said image sensing means.

3. A device according to claim 1, wherein said computing means is arranged to normalize an output of said first detecting means with an output of said second detecting means.

4. A device according to claim 1, wherein said computing means is arranged to compute outputs of said first and second detecting means, to judge whether said relative variations are based on a movement of said device or a movement of an object.

5. A device according to claim 4, wherein said control means is arranged to judge that said relative variations are based on the movement of the object when said relative variations are lower than a predetermined value as the result of computation of said computing means and to judge that said relative movements are based on the movement of said device when said relative variations are higher than the predetermined value as the result of computation of said computing means.

6. A device according to claim 5, wherein said control means is arranged to continue the operation of said focus adjusting means when said relative variations are judged to be based on the movement of the device as a result of computation of said computing means and to stop the operation of said focus adjusting means when said relative variations are judged to be not based on the movement of said device.

7. An apparatus according to claim 1, wherein said second detecting means detects the total value of differences in said predetermined component between vertically adjacent areas of said image sensing plane.

8. An automatic focusing device comprising:
a) luminance difference producing means for producing information on a luminance difference between adjacent areas among a plurality of areas set on an image sensing plane of image sensing means;
b) first detecting means for detecting variations of information on the luminance difference in a plurality of fields differing timewise from each other;
c) computing means for obtaining a degree of relative variations of information images formed on the image sensing plane in different fields by computing the result of detection made by said first detecting means; and
d) control means for controlling a focus adjusting action on the basis of an output of said computing means.

9. A device according to claim 8, wherein said image sensing means is a CCD.

10. A device according to claim 8, wherein said control means is arranged to lock said focus adjusting action into a stopped state when the output of said computing means is above a predetermined value.

11. A device according to claim 10, wherein said control means is arranged to allow said focus adjusting action to continue when the output of said computing means is less than said predetermined value.

12. A device according to claim 11, further comprising second detecting means for detecting a cluttered degree of image information formed on said image sensing plane.

13. A device according to claim 12, wherein said computing means is arranged to produce information obtained by normalizing an output of said first detecting means with an output of said second detecting means.

14. A device according to claim 13, wherein said second detecting means is arranged to detect a total, for one image plane, of luminance differences between horizontally adjacent areas of said image sensing plane.

15. A device according to claim 13, wherein said second detecting means is arranged to detect a total, for one image plane, of luminance differences between vertically adjacent areas of said image sensing plane.

16. A device according to claim 8, wherein said information on the luminance difference is binary coded information.

17. A device according to claim 8, wherein said luminance difference producing means is arranged to obtain a luminance difference between horizontally adjacent areas on said image sensing plane.

18. A device according to claim 8, wherein said luminance difference producing means is arranged to obtain a luminance difference between vertically adjacent areas on said image sensing plane.

19. A device according to claim 8, further comprising second detecting means for detecting a cluttered degree of image information formed on said image sensing plane.

20. A device according to claim 19, wherein said computing means is arranged to produce information obtained by normalizing an output of said first detecting means with an output of said second detecting means.

21. A device according to claim 20, wherein said second detecting means is arranged to detect a total, for one image plane, of luminance differences between horizontally adjacent areas of said image sensing plane.

22. A device according to claim 20, wherein said second detecting means is arranged to detect a total, for one image plane, of luminance differences between vertically adjacent areas of said image sensing plane.

23. A device according to claim 8, wherein said plurality of areas is set in a lattice-like form on said image sensing plane.

24. An image receiving apparatus having an image movement detecting device comprising:
a) digital coding means arranged to sample information on an image on an image plane of image receiving means in a plurality of areas of said image plane, and to digital-code the sampled information in accordance with a predetermined algorithm to produce digital coded information;
b) detecting means for comparing digital coded information in each of the plurality of areas in one field with that in another field among a plurality of fields differing timewise from each other to detect a change in digital coded information; and
c) computing means for computing information on a position on the image plane of an area in which the change in the digital coded information has been detected by said detecting means to detect a moved position of image information on said image plane; and
d) control means for controlling a focus adjusting operation on the basis of an output of said computing means.

25. A device according to claim 24, wherein said digital coding means is arranged to detect a luminance difference between horizontally adjacent areas on said image sensing plane.

26. A device according to claim 24, wherein said digital coding means is arranged to detect a luminance difference between vertically adjacent areas on said image sensing plane.

27. A device according to claim 24, wherein said digital coding means is arranged to sample the luminance signal component contained in the image signal outputted from said image receiving means.

28. A device according to claim 24, wherein said detecting means is arranged to normalize the change in the information with a signal indicating a cluttered degree of a picture plane.

29. A device according to claim 28, wherein said computing means is arranged to judge whether said change is based on a movement of said apparatus or based on a movement of the object, on the basis of an output of said detecting means.

30. An apparatus according to claim 29, wherein said control means is arranged to detect an area of an object image on the basis of a result of computation of said computing means and to change a size of the focus detecting area according to the area of said object image.

31. An apparatus according to claim 29, wherein said control means is arranged to continue said focus adjusting operation when said change is judged to be not based on the movement of said apparatus as the result of computation of said computing means and to stop said focus adjusting operation when said change is judged to be based on the movement of said apparatus.

32. An apparatus according to claim 24, wherein said control means is arranged to detect a moved position of an object image on the basis of a result of computation of said computing means and to cause a position of focus detecting area to follow said object image.

33. An image movement detecting device comprising:
   a) binary coding means movement arranged to sample information on an image on an image plane of image receiving means in a plurality of areas of said image plane, and to binary-code the sampled information in accordance with a predetermined algorithm to produce binary coded information;
   b) first detecting means for comparing binary coded information in each of the plurality of areas in one field with that in another field among a plurality of fields differing timewise from each other to detect a change in the binary coded information;
   c) second detecting means for detecting a cluttered degree of image information on said image plane;
   d) computing means for computing information on a position on the image plane of an area in which the change in the binary coded information has been detected by said first detecting means to detect a moved position of image information on said image plane; and
   e) focus control means for controlling a focus condition on the basis of an output of said computing means.

34. An apparatus according to claim 33, wherein said focus control means is arranged to set the focus detecting area at a position of the image information computed by said computing means formed on said image plane.

35. An apparatus according to claim 34, wherein said focus control means includes means for effecting focus adjustment by extracting a high frequency component, which varies in response to a focus condition, from an output signal of said image sensing means corresponding to said focus detecting area.

36. An automatic focusing device comprising:
   a) binary coding means arranged to sample information on an image formed on an image sensing plane of image sensing means in a plurality of areas on said image sensing plane, and to binary-code the sampled information in accordance with a predetermined law to produce binary coded information;
   b) first detecting means for comparing binary coded information in each of said plurality of areas in one field with that in another field among a plurality of fields differing timewise from each other to detect a change in the binary coded information;
   c) computing means for computing information on a position on the image sensing plane of an area in which the change in the binary coded information has been detected by said first detecting means to detect a moved position of image information formed on said image sensing plane;
   d) zone setting means for setting a focus detecting zone on said image sensing plane; and
   e) control means for controlling a position of said focus detecting zone on said image sensing plane by controlling said zone setting means according to an output of said computing means,
   said binary coding means being arranged to binary-code a luminance difference between adjacent areas on said image sensing plane to produce binary coded information.

37. An apparatus according to claim 36, further comprising second detecting means for detecting a cluttered degree of image information formed on said image sensing plane.

38. An apparatus according to claim 37, wherein said computing means is arranged to produce information obtained by normalizing an output of said first detecting means with an output of said second detecting means, and said second detecting means is arranged to produce a total, for one image plane, of luminance differences obtained between vertically adjacent areas among said plurality of areas.

39. An apparatus according to claim 38, wherein said focus control means includes means for effecting focus adjustment by extracting a high frequency component, which varies in response to a focus condition, from an output signal of said image sensing means corresponding to said focus detecting area.

40. An automatic focusing device comprising:
   a) binary coding means arranged to sample information on an image formed on an image sensing plane of image sensing means in a plurality of areas on said image sensing plane, and to binary-code the sampled information in accordance with a predetermined law to produce binary coded information;
   b) first detecting means for comparing binary coded information in each of said plurality of areas in one field with that in another field among a plurality of fields differing timewise from each other to detect a change in the binary coded information;
   c) computing means for computing information on a position on the image sensing plane of an area in which the change in the binary coded information has been detected by said first detecting means to detect a moved position of image information formed on said image sensing plane;
   d) zone setting means for setting a focus detecting zone on said image sensing plane; and
   e) control means for controlling a position of said focus detecting zone on said image sensing plane by controlling said zone setting means according to an output of said computing means,
   said binary coding means being arranged to detect a luminance difference between horizontally adjacent areas on said image sensing plane.

41. An apparatus according to claim 40, further comprising second detecting means for detecting a cluttered degree of image information formed on said image sensing plane.

42. An apparatus according to claim 41, wherein said computing means is arranged to produce information obtained by normalizing an output of said first detecting means with an output of said second detecting means, and said second detecting means is arranged to produce a total, for one image plane, of luminance differences obtained between vertically adjacent areas among said plurality of areas.

43. A device according to claim 42, wherein said focus control means includes means for effecting focus adjustment by extracting a high frequency component, which varies in response to a focus condition, from an output signal of said image sensing means corresponding to said focus detecting area.

44. An automatic focusing device comprising:
   a) binary coding means arranged to sample information on an image formed on an image sensing plane of image sensing means in a plurality of areas on said image sensing plane, and to binary-code the sampled information in accordance with a predetermined law to produce binary coded information;

b) first detecting means for comparing binary coded information in each of said plurality of areas in one field with that in another field among a plurality of fields differing timewise from each other to detect a change in the binary coded information;

c) computing means for computing information on a position on the image sensing plane of an area in which the change in the binary coded information has been detected by said first detecting means to detect a moved position of image information formed on said image sensing plane;

d) zone setting means for setting a focus detecting zone on said image sensing plane; and e) control means for controlling a position of said focus detecting zone on said image sensing plane by controlling said zone setting means according to an output of said computing means, said binary coding means being arranged to detect a luminance difference between vertically adjacent areas on said image sensing plane.

45. An apparatus according to claim 44, further comprising, second detecting means for detecting a cluttered degree of image information formed on said image sensing plane.

46. An apparatus according to claim 45, wherein said computing means is arranged to produce information obtained by normalizing an output of said first detecting means with an output of said second detecting means, and said second detecting means is arranged to produce a total, for one image plane, of luminance differences obtained between vertically adjacent areas among said plurality of areas.

47. An apparatus according to claim 46, wherein said control means includes means for effecting focus adjustment by extracting a high frequency component, which varies in response to a focus condition, from an output signal of said image sensing means corresponding to said focus detecting area.

48. An automatic focusing device comprising:

a) binary coding means arranged to sample information on an image on an image plane of image receiving means in a plurality of areas on said image plane, and to binary-code the sampled information in accordance with a predetermined algorithm to produce binary coded information;

b) first detecting means for comparing binary coded information in each of said plurality of areas in one field with that in another field among a plurality of fields differing timewise from each other to detect a change in the binary coded information;

c) second detecting means for producing a total, for one image plane, of luminance differences obtained between vertically adjacent areas among said plurality of areas;

d) computing means for computing information on a position on the image plane of an area in which the change in the binary coded information has been detected by said first detecting means to detect a moved position of image information on said image plane;

e) zone setting means for setting a focus detecting zone on said image plane; and f) control means for controlling a position of said focus detecting zone on said image plane by controlling said zone setting means according to an output of said computing means, said computing means being arranged to produce information obtained by normalizing an output of said first detecting means with an output of said second detecting means.

49. An apparatus according to claim 48, wherein said control means includes means for effecting focus adjustment by extracting a high frequency component, which varies in response to a focus condition, from an output signal of said image sensing means corresponding to said focus detecting area.

50. An image processing apparatus having a focus control device, comprising:

(A) digital conversion means for converting image signals corresponding to a plurality of blocks set in a picture plane, respectively, into digital signals;

(B) movement detecting means arranged to detect a change of digital signals in each block between picture planes, thereby detecting the block where the change of movement between said picture planes occurs;

(C) computing means for computing an output of said movement detecting means, thereby judging the movement of a main image in said picture plane; and (D) control means for controlling said focus control device on the basis of an output of said computing means.

51. An apparatus according to claim 50, wherein said digital conversion means is arranged to binary code a luminance signal level in each of said blocks, and said computing means is arranged to detect an amount of movement on the basis of a total sum of the blocks where changes of the binary coded luminance level occur.

52. An apparatus according to claim 51, wherein said computing means is arranged to judge whether the movement of said image is a movement of said main image or a movement of said apparatus on the basis of amount of said movement, and said control means is arranged to stop the focus adjusting operation of said focus control device when the movement of said image is the movement of said apparatus.

53. An apparatus according to claim 51, wherein said computing means is arranged to compute a moved position of said main image in said picture plane, and said control means is arranged to set a focus detecting area at the moved position of said main image.

54. An apparatus according to claim 50, comprising cluttered degree detecting means for detecting a cluttered degree of a picture plane on the basis of an output of said digital conversion means corresponding to each of said blocks.

55. An apparatus according to claim 54, wherein said computing means is arranged to normalize the output of said movement detecting means with the output of said cluttered degree detecting means.

* * * * *

UNITED STATES PATENT AND TRADEMARK OFFICE
CERTIFICATE OF CORRECTION

PATENT NO. : 5,422,671
DATED : June 6, 1995
INVENTOR(S) : Kunihiko Yamada, et al.

It is certified that error appears in the above-indentified patent and that said Letters Patent is hereby corrected as shown below:

Col. 2, line 6, first occurrance, delete "at".

Col. 2, line 32, first occurrance, delete "the".

Col. 9, line 3, first occurrance, delete "the".

Col. 11, line 36, change "occurred" to -- occurring --.

Col. 11, line 61, change "changes" to -- change --.

Col. 13, line 21, change "latice-like" to -- lattice-like --.

Col. 16, line 25, after "fluctuate" insert -- , --.

Col. 17, line 5, change "occurred" to -- occurring --.

Col. 19, line 38, after "frame" insert -- is --.

Signed and Sealed this

Twenty-seventh Day of August, 1996

Attest:

BRUCE LEHMAN

*Attesting Officer*     *Commissioner of Patents and Trademarks*